Oct. 27, 1970 H. SULLIVAN 3,536,840

DIGITAL DATA TRANSMISSION SYSTEM WITH A VARIABLE TRANSMISSION RATE

Filed April 25, 1969 3 Sheets-Sheet 1

Oct. 27, 1970 H. SULLIVAN 3,536,840

DIGITAL DATA TRANSMISSION SYSTEM WITH A VARIABLE TRANSMISSION RATE

Filed April 25, 1969 3 Sheets-Sheet 3

United States Patent Office 3,536,840

Patented Oct. 27, 1970

3,536,840

DIGITAL DATA TRANSMISSION SYSTEM WITH A VARIABLE TRANSMISSION RATE

Herbert Sullivan, Fort Lee, N.J., assignor to Computer Modem Corporation, Fort Lee, N.J., a corporation of New Jersey Filed Apr. 25, 1969, Ser. No. 819,150
Int. Cl. H04m 11/06
U.S. Cl. 179—2 15 Claims

ABSTRACT OF THE DISCLOSURE

A digital data transmission system having a data transmission rate continually adapted to existing communication channel transmission characteristics. A digital data transmitter is provided with the capacity for generating data signals at a variable rate. A remote data receiver is connected to the transmitter by a telephone communication channel and is provided with an analyzer capable of determining channel transmission characteristics from received data signals and determining therefrom the optimum present rate for conducting data signals over the channel to permit maximum intelligible data exchange. This rate information is supplied to the transmitter to conform its data generation rate to the optimum rate.

BACKGROUND OF THE INVENTION

Field of the invention

This invention relates to data communication and particularly to a system for the transmission of digital data signals from a first station to a second station over a telephone communication line.

Description of the prior art

Existing systems for the telephonic communication of digital data signals between a data source and a remotely located data receiver generally include at the source, a dat input device, a modulator for properly conditioning data signals generated by the input device for transmission on the telephone line and input control means for receiving data sigals from the input device and applying them to the modulator. At the remote receiver such systems include a demodulator for receiving modulated data signals from the telephone line and regenerating the data signals, a data output device and output control means interconnecting the demodulator and the output device. Temporary data storage units or buffers are typically associated with the input and output devices, and include means for generating an alert or control signal indicating that full buffer capacity has been attained. The data receiver generally incorporates apparatus for encoding and modulating the buffer alert or control signal for transmission to the source input control means. The source normally includes apparatus for demodulating and decoding the alert signals to interrupt data signal generation until the alert condition is remedied.

The telephone line with which the data modulator and demodulator cooperate in a conventional voice grade telephone line the transmission characteristics of which, e.g. minimum bandwidth and maximum noise, are established in a tariff filed with the government. The noise occurring on the telephone line falls into two categories: (1) that due to the Brownian phenomenon and occurring in a Gaussian distribution about zero energy level, and (2) that occurring in bursts due to spurious environmental disturbances. The former noise is predictable and the system may be designed to tolerate it. On the other hand, the burst noise is unpredictable and results occasionally in an unintelligible or uncorrectable message at the receiver. It is customary to include means in the receiver to generate a repeat transmission request and to include means at the source to receive this control signal and initiate a retransmission of the message from the temporary storage device.

Of primary concern in the development of a practical data communication system is the full utilization of the telephone line data transmission capacity, i.e. to maximize the number of data bits which can be intelligibly transmitted and received per unit of transmission time. For the conventional telephone line a maximum practical capacity, the Shannon rate, has been computed to be about 30,000 bits per second for a bandwidth of 2500 cycles and a signal to random noise ratio of $2^{12}$. The realization of presently known systems is at best 10,000 bits per second, a quite limited approach to exploitation of the communication channel.

Data transmission capacity is severely limtied by burst noise as described above and further by telephone line transmission frequency characteristics. In particular departures of both the phase and amplitude frequency responses of the line from ideal responses give rise to linear and nonlinear distortion of transmitted signals. Existing systems compensate for distortions of transmitted signals by incorporating telephone line equalization apparatus. Such apparatus is normally introduced in series between the telephone line and the data receiver. The output of the equalizer is constantly compared with a desired standard to generate weighted error signals which are employed to adjust the effective equalization, i.e. to inject controlled distortion into received signals so that they more closely approach the transmitted signals. In existing systems, the equalization apparatus has normally taken the form of an analog circuit element, such as a transversal filter. Digital techniques for equalization have been proposed in recent literature.

While prior art data communication systems have attempted both to compensate the non-ideal transmission characteristics of telephone lines by equalization techiques and to limit line noise, these systems have either transmitted at a predetermined fixed rate or at no rate whatever when telephone line parameters did not permit transmission and receipt of intelligible data at the predetermined rate. These systems have not controlled source data rate to accommodate maximum transmission of intelligible data in accordance with instantaneous changes in line parameters.

SUMMARY OF THE INVENTION

In the data transmission system of the invention, a data transmission capacity of approximately twice that of prior art systems is effected by the incorporation of a data rate control means operatively responsive to the changing effects of telephone line parameters on transmitted data to constantly adapt data rate to its maximum permissible value in the then existing environment. To this effect, the system of the invention includes in the data receiver, in addition to means for analyzing received transmissions to produce control signals compensating said transmissions for linear distortion produced therein by line parameters, a further means for analyzing the quality of received transmissions to produce control signals for use at said source to increase or decrease the rate of data transmission.

By the introduction of data rate control, the system of the invention is made compatible with transmission lines which are of either inherently low bandwidth or which may suffer severe bandwidth reductions while in use. Such lines were completely unsuited for use by prior art data communication systems, since such systems were incapable of adapting their transmission rate to permit intelligible exchange of data. In the face of less drastic fluctuation in line parameters, the system of the invention is likewise operative to permit maximum data exchange.

It is a primary object of the invention to provide a digital transmission system having improved data exchange capacity.

It is another object of the invention to provide a digital data transmission system, the data transmission rate of which is constantly adapted to the optimum rate permitted by parameters of the associated communication channel.

These and other objects, features and advantages of the invention will be evident from the following description of the invention and from the drawings of preferred embodiments wherein like numerals identify like apparatus throughout.

DESCRIPTION OF THE PREFERRED EMBODIMENTS

Figure 1:
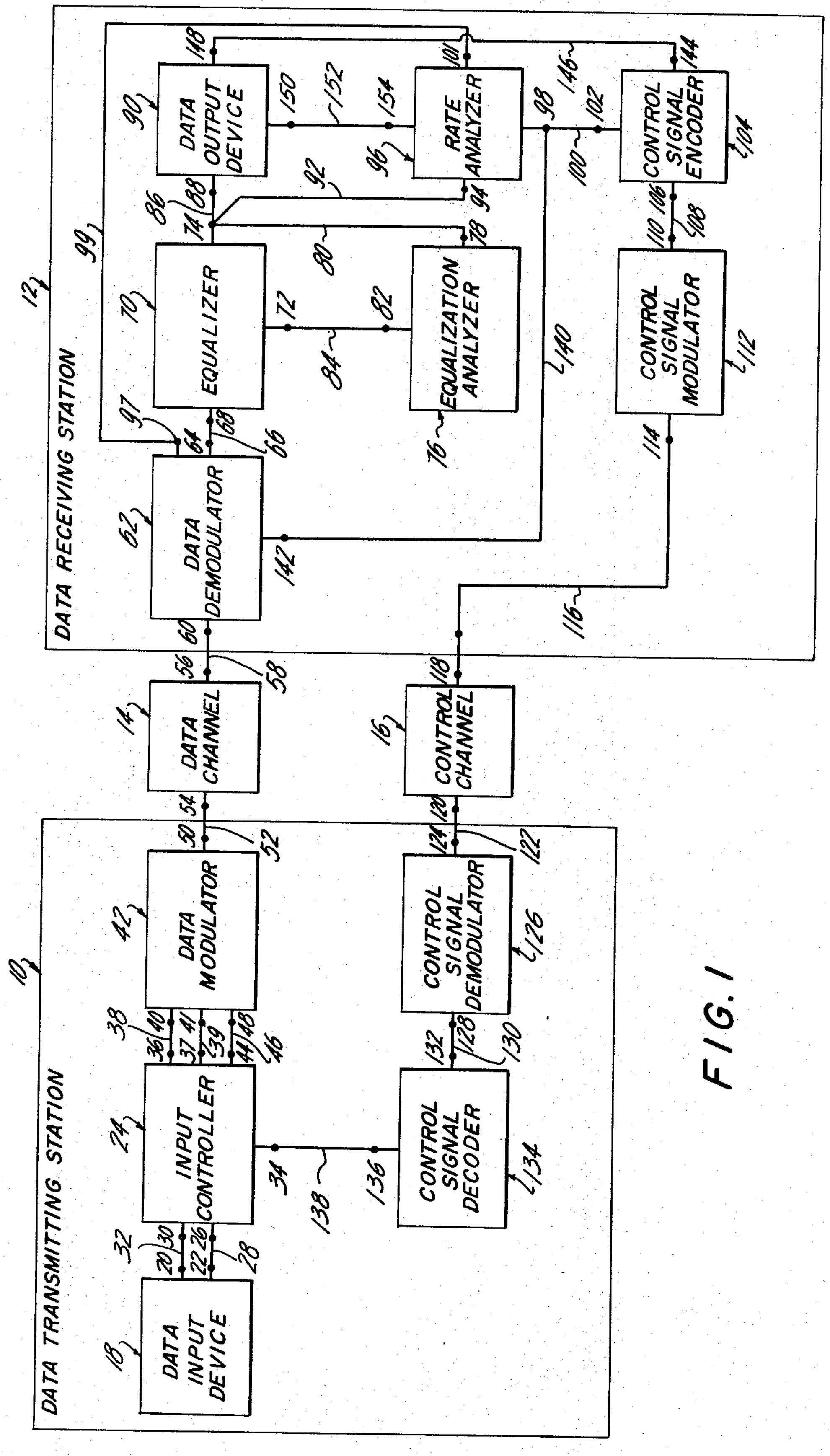
FIG. 1 is a block diagram of the system of the invention.

In FIG. 1 the basic arrangement of the functional elements comprising the present digital data communication system is illustrated. The system comprises a data transmitting station 10, a data receiving station 12, a first communciation channel 14 for transmission flow from station 10 to station 12 and a second communication channel 16 for transmission flow from station 12 to station 10. Channel 14 shall hereinafter be referred to as the forward or data channel and channel 16 the reverse or control channel. While the channels are shown as separate links, the reverse channel may be multiplexed onto the line with the main channel and control information transmitted in the opposite direction to data flow.

Data transmitting station 10 includes a data input device 18 which generates at output terminal 20 digital data signals which are to be transmitted by data channel 14 for use at the remotely located data receiving station 12. Device 18 generally consists of a ready access storage unit whose data generation characteristics may be controlled by signals applied to control terminal 22. These signals serve to cause device 18 to initiate generation of data signals, to terminate generation of data signals or to regenerate any data signal grouping previously generated. All such control signals applied to terminal 22 of input device 18 are derived from input controller 24, and are conducted from output terminal 26 of the controller over line 28. At input terminal 30 controller 24 receives the data signals flowing from terminal 20 over line 32. At input terminal 34 controller 24 receives control signals which, as will be described in detail hereinafter, have their origin in analysis in data receiver 12 of instantaneous transmission characteristics of forward communication channel 14.

Figure 2:
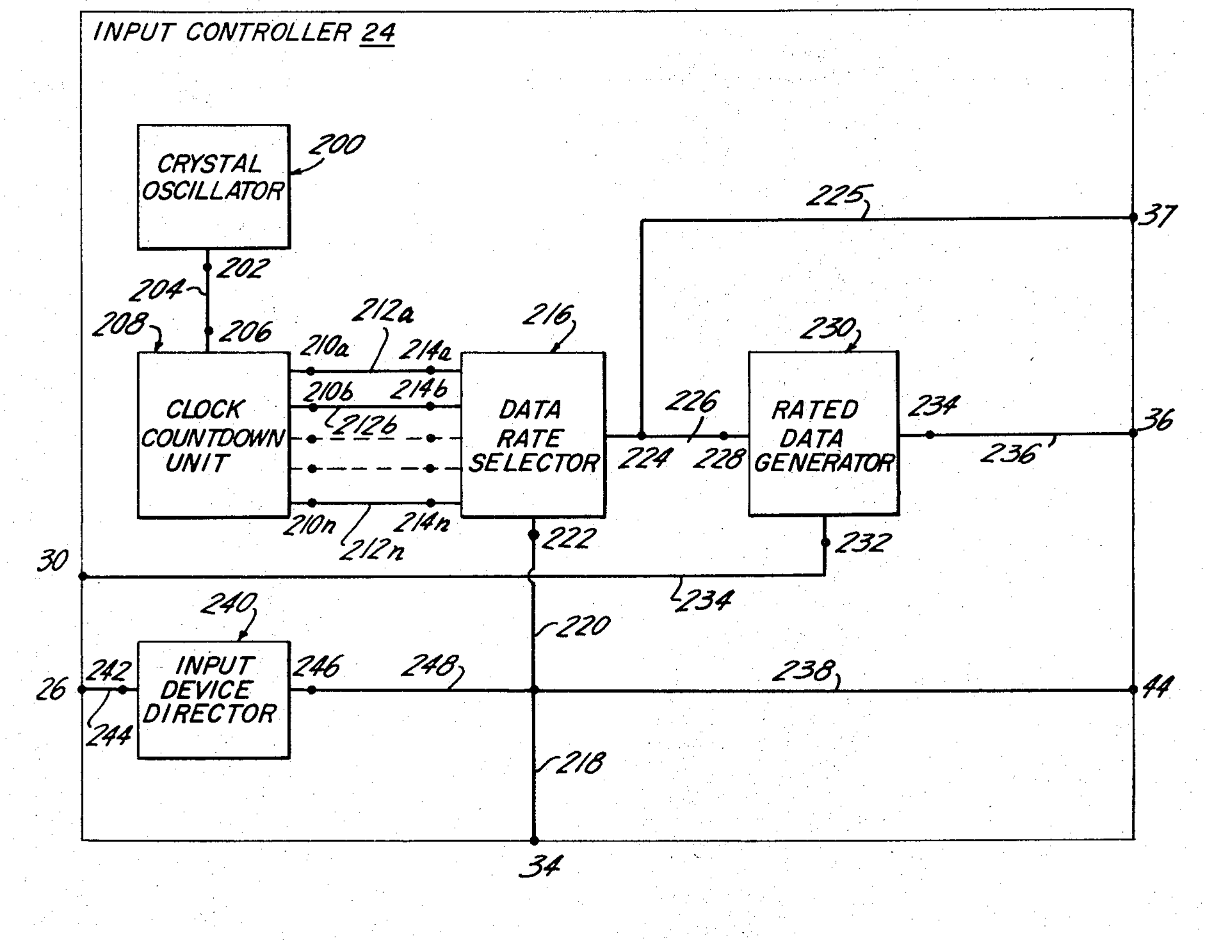
FIG. 2 is a block diagram of the input controller of FIG. 1.

In response to input signals at terminal 34, controller 24 generates at output terminal 36 rated data signals, the periodicity of which is asynchronously related to the data signals applied to input terminal 30. As an illustrative example, let us assume that input device 18 generates the data-bit pattern 1011 at a bit rate of 20,000 bits per second. If controller 24 derives a command at terminal 34 to generate rated data signals at a bit rate of 19,200 bits per second, the pulse pattern 1011 will appear at controller output terminal 36 at this bit rate. Clock pulses at the command bit rate are generated at output terminal 37 of the controller. The preferred circuitry for controller 24 is shown in FIG. 2 and will be discussed hereinafter.

Controller terminal 36 is connected by line 38 to input terminal 40 of data modulator 42. Terminal 37 is connected by line 39 to modulator terminal 41. This unit may employ any suitable form of pulse modulation but in the present embodiment it will be assigned the task of modulating the rated data signals by a phase modulation technique. The modulator will further operate with a variable carrier frequency set by signals generated at controller 24 output terminal 44 and conducted over line 46 to modulator input terminal 48. The preferred circuitry for the modulator will be discussed hereinafter in connection with FIG. 3.

The modulated rated data signals are conducted from modulator output terminal 50 over line 52 to the input terminal 54 of forward channel 14. From output terminal 56 of the channel they are fed over line 58 into data receiver 12, and therein to input terminal 60 of data demodulator 62.

Figure 4:
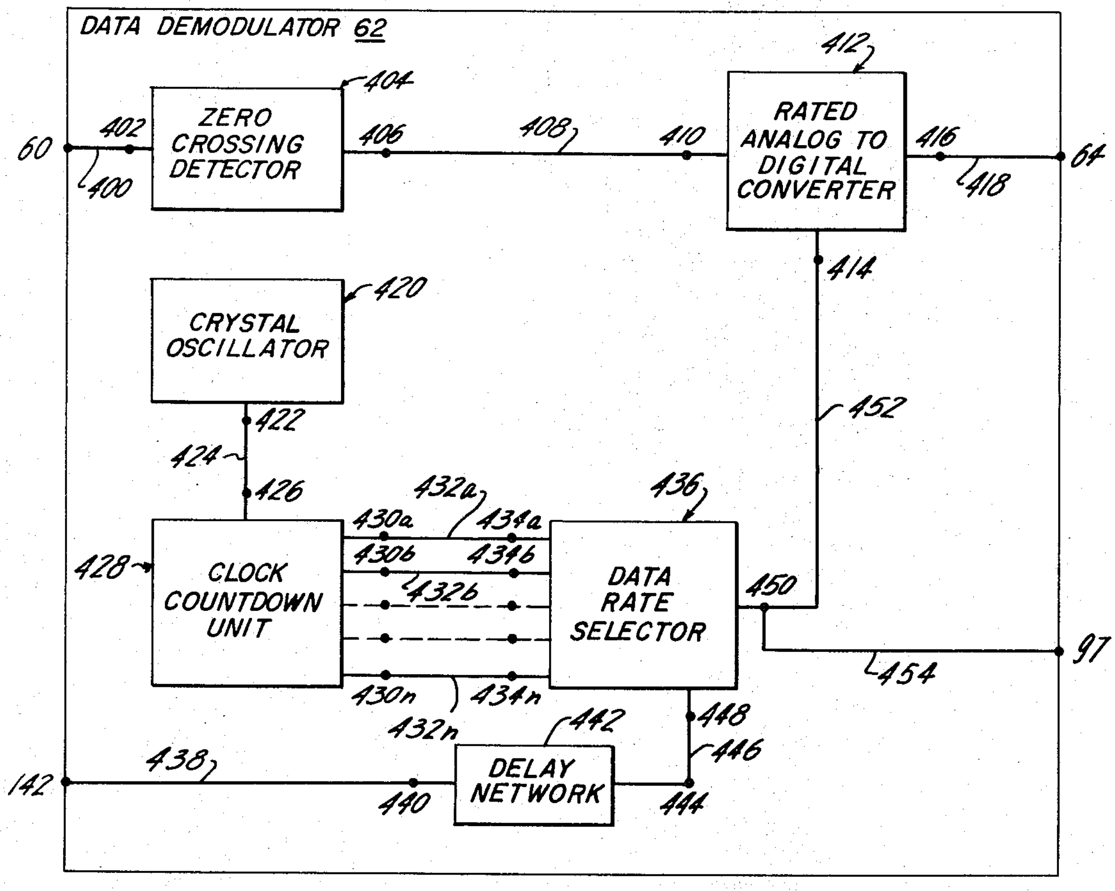
FIG. 4 is a block diagram of the data demodulator of FIG. 1.

Data demodulator 62 operates to regenerate transmitted data at the rate established by controller 24. A preferred form of the demodulator will be discussed subsequently in connection with FIG. 4. The regenerated data is conducted from demodulator output terminal 64 over line 66 to the input terminal 68 of equalizer 70. This unit responds to control signals applied to terminal 72 to modify the regenerated data signals to compensate transmission line-induced effects therein and to conduct these signals to output terminal 74. The equalization control signals are derived from equalization analyzer 76, input terminal 78 of which is connected by line 80 to terminal 74. Analyzer operation shall be considered hereinafter in the more particular description of the system. Suffice it to say for the present that the unit generates requisite equalization signals at output terminal 82 which is connected by line 84 to equalizer terminal 72.

Equalized data signals are also conducted from terminal 74 over line 86 to the input terminal 88 of data output device 90 which conducts data to any suitable data utilization apparatus. Extending in parallel from terminal 74 is line 92 which conducts regenerated data to the input terminal 94 of rate analyzer 96.

Analyzer 96 includes first means for processing the regenerated equalized data signals to evaluate the amplitude and phase response characteristics of forward channel 14 and to determine therefrom the data transmission rate permitting maximum exchange of intelligible data commensurate with existing channel transmission characteristics. Existing data rate information may be supplied to analyzer terminal 101 from demodulator terminal 97 over line 99. The analyzer includes further means responsive to the evaluation processing means to generate a rate control signal corresponding to the analyzer determined rate. This signal is coupled through line 100 to the input terminal 102 of control signal encoder 104 which translates the signal into an appropriate control signal. Preferably, the encoder translates the input signal into an assigned frequency or tone at a particular amplitude. Alternatively, the encoder may generate a digital control message. The encoder output, generated at terminal 106 is conducted over line 108 to input terminal 110 of control signal modulator 112, whose output is in turn coupled from terminal 114 over line 116 to reverse channel 16 input terminal 118.

The modulated rate control signal is routed from reverse channel output terminal 120 over line 122 to the input terminal 124 of control signal demodulator 126. The demodulator output generated at terminal 128 is coupled over line 130 to input terminal 132 of control signal decoder 134. The decoded rate signal is then fed from decoder output terminal 136 over line 138 to controller input terminal 34 whereupon the desired change in system data transmission rate is effected.

The rate control signal generated at terminal 98 of analyzer 96 is also used to establish receiver timing. In this regard, the signal is coupled over line 140 to input terminal 142 of demodulator 62.

An added function of encoder 104 is to inform the transmitter of malfunction of data utilization equipment, of excess capacity in the buffer of unit 90, or of the receipt of an uncorrectable message. To this effect, the encoder has a further input terminal 144 which is connected by line 146 to terminal 148 of output device 90. Unit 90 generates control signals indicative of these conditions at this terminal and after encoding they are transmitted to input controller 24.

In a modified version of the system, data output device 90 may provide information as to data transmission accuracy. Such information is generated at output terminal 150 and fed over line 152 to input terminal 154 of rate analyzer 96.

Figure 1A:
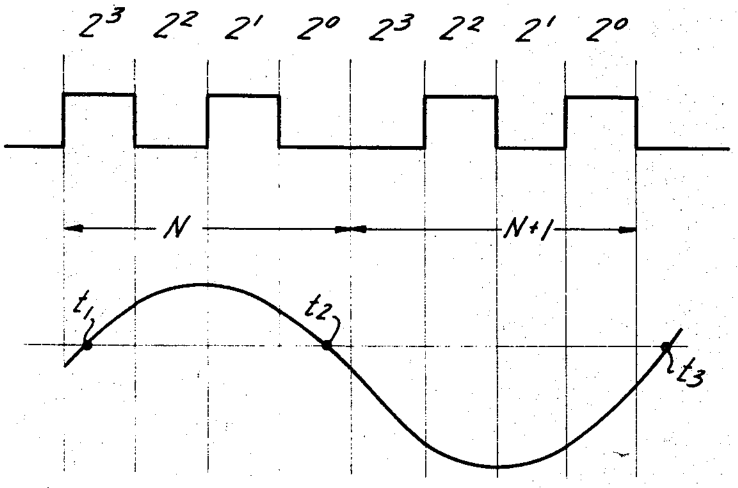
FIG. 1*a* is a timing diagram illustrating the modulation technique preferably employed in the practice of the invention.

Before proceeding with a description of the preferred circuitry for input controller 24, data modulator 42 and data demodulator 62, the phase modulation technique of the system will be outlined briefly to better illustrate the functional interrelationship of system elements. In FIG. 1*a* two successive rate controlled four-bit data patterns are illustrated. The first pattern represents the binary word 0101 having the value of $2^0$ plus $2^2$ or five. The second pattern represents the binary word 1010 having the value of $2^1$ plus $2^3$ or ten. A data rate of 20,000 bits per second is assumed and the binary words are assigned to the half cycles N and $N+1$ of the carrier of modulator 42. The entire cycle N plus $N+1$ consisting of eight bits thus has a period of .0004 second and the corresponding carrier frequency is 2500 cycles per second.

The rated data of FIG. 1*a* and the carrier frequency control of 2500 hertz is applied to input terminals 40 and 48 of modulator 42, respectively. The modulator responds to these signals to set its carrier frequency to 2500 hertz and to phase modulate the cycle N plus N+1 of the carrier such that the second data word 1010 is determinable from the cycle zero-crossings. This modulation is shown in FIG. 1*a* where the difference between the zero-crossings may be observed to be $(t_3-t_2)$ minus $(t_2-t_1)$, a quantity which will identify the analog value of 12 and the binary word 1010 when processed by the data demodulator 62 at the receiver. It will be seen that controller 24 and modulator 42 have cooperated to establish system data rate, to perform a digital to analog conversion and to condition data for transmission on forward channel 14.

In the event that the optimum system data rate is less than the 20,000 bit rate of the above example, the rate control signal supplied to terminal 34 of controller 24 will direct a reduction in data rate to, let us say 10,000 bits per second. Controller 24 will respond by generating rated data at 10,000 bits per second or 4 bits each .0004 second and will generate a signal at terminal 44 directing that the modulator set carrier frequency accordingly to 1250 hertz.

This procedure, adaptive data rate control, may be conducted in the system in a test or a dynamic mode. In the test mode, a test pattern is generated at the lowest data rate which controller 24 can establish. The system will cycle at this rate and if analyzer 96 determines that a faster rate can be tolerated, it will so advise the controller 24. The system will cycle at the new rate and at further rates until the rate for maximum intelligible data exchange is achieved.

Referring to FIG. 2 input controller 24 comprises a crystal oscillator 200 which provides at its output terminal 202 a precise 19.2 kc. clock for timing all data transmitting operations. The clock is delivered over line 204 to the input terminal 206 of clock countdown unit 208. This unit is a simple pulse counter providing at its output terminals 210*a*, 210*b* . . . 210*n* clock pulses at frequencies which are submultiples of 19.2 kc. These terminals are connected by lines 212*a*, 212*b* . . . 212*n* to input terminals 214*a*, 214*b* . . . 214*n* of data rate selector 216.

The data rate control signal as illustrated in FIG. 1 is applied to input terminal 34 of the input controller 24. It is conducted from terminal 34 to within the controller by line 218 and from line 218 to line 220 which is coupled to input terminal 222 of selector 216. The selector operates in response to this signal to gate one of the inputs applied to its input terminals 214*a*, 214*b* . . . 214*n* to selector output terminal 224. This selected rate is fed over line 225 to controller output terminal 37 and over line 226 to input terminal 228 of rated data generator 230.

Generator 230 receives unrated data signals at terminal 232 which is connected by line 234 to controller 24 input terminal 30. This terminal is in turn connected to data input device 18 (FIG. 1). The rated data generator 230 provides at its output terminal 234 rated data signals, i.e. it reconstitutes the data from input device 18 at the rate selected by device 216. The rated data signals are coupled over line 236 to controller output terminal 36 and thence to modulator 42 (FIG. 1).

The rate control signal is coupled also from line 218 to line 238 which terminates at output terminal 44 of the controller. This signal will be effective to set the carrier frequency of modulator 42.

A further function of controller 24 is to provide directional signals to input device 18. The signal for initiating data transmission is independently generated in input device director 240 and conducted from output terminal 242 thereof over line 244 to terminal 26, which is in turn connected to input device 18 (FIG. 1). For other device 18 control signals, director 240 is responsive to input signals applied to input terminal 246 thereof. These signals, such as stop transmission and repeat transmission, are coupled from line 218 over line 248 to terminal 246.

Figure 3:
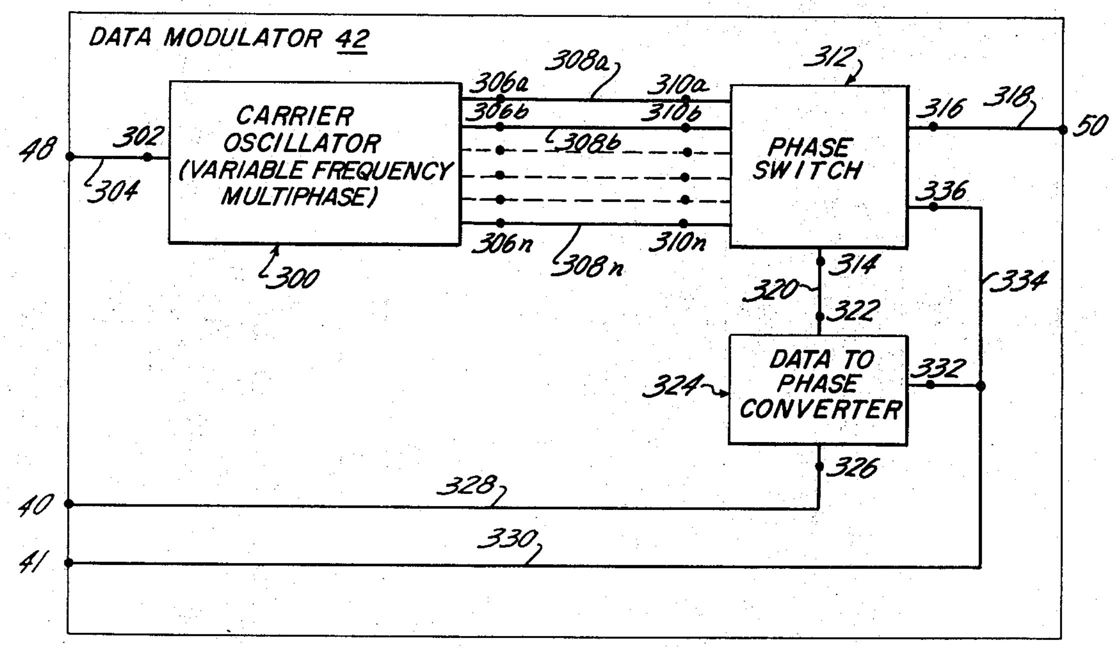
FIG. 3 is a block diagram of the data modulator of FIG. 1.

In FIG. 3 the carrier oscillator of data modulator 42 is indicated as element 300. This unit is a continuous wave variable frequency unit having a frequency control input terminal 302 which is connected by line 304 to modulator terminal 48. The oscillator has a plurality of output terminals 306*a*, 306*b* . . . 306*n* at each of which the frequency control carrier is available at a different phase angle. These terminals are connected by lines 308*a*, 308*b* . . . 308*n* to the input terminals 310*a*, 310*b* . . . 310*n* of phase switch unit 312. The switch unit is effective under control of phase selection signals applied to input terminal 314 thereof to gate the carrier through the switch unit to output terminal 316 at one of the plurality of phase angles. This terminal is in turn connected to modulator output terminal 50 by line 318.

The phase selection signals are coupled to terminal 314 over line 320 from output terminal 322 of data to phase converter 324. Rated data is conducted to converter input terminal 326 over line 328 which is connected at its other end to modulator terminal 40. Also conducted to converter 324 is the clock pulse selected by data rate selector 216 (FIG. 2). This pulse train is coupled from modulator input terminal 41 over line 330 to data decoder input terminal 332. This timing signal is also coupled over line 334 to terminal 336 of phase switch 312.

The function of converter 324 is to gather incoming rated data signals into data words, to translate the pulse pattern in each word to an analog value, and to generate phase selection signals for phase switch 312 such that the analog value for a given data word will be identified in the phase-modulated carrier by the difference between the zero-crossings of successive half-cycles thereof. In order to accomplish its function of forming data words, the unit is provided with present clock pulse rate at terminal 332 and rated data signals at terminal 326.

In the functional schematic of receiver data demodulator 62 (FIG. 4) incoming modulated data signals are routed from input terminal 60 over line 400 to the input terminal 402 of zero-crossing detector 404. This unit determines from the difference in each successive pair of carrier wave zero-crossings and provides at its output terminal 406 analog signals corresponding to those generated by data to phase converter 324 of the data modulator 42. Each signal represents a data word and is conducted over line 408 to the input terminal 410 of rated analog to digital converter 412. This unit is informed of the data rate at which the received data word was transmitted by a signal applied to input terminal 414 of the converter. With the analog input and rate information, the converter operates to regenerate the transmitted data at output terminal 416 thereof. This data is then led over line 418 to demodulator output terminal 64.

The manner in which data rate information is supplied to converter 412 may parallel the manner in which the rate was established in the transmitter. To this extent, the converter includes a crystal oscillator 420 whose frequency is identical with that of oscillator 200 (FIG. 2). The pulsed output of the unit is led from output terminal 422 over line 424 to terminal 426 of clock countdown unit 428 which as in the case of its counterpart unit 208 (FIG. 2) provides clock pulses at diverse rates at terminals **430*a*, 430*b* . . . 430*n*. These terminals are coupled by lines 432*a*, 432*b* . . . 432*n* to the input terminals 434*a*, 434*b* . . . 434*n* of data rate selector 436**.

The same data rate control signal which was supplied to the transmitter by control signal encoder 104 (FIG. 1) is supplied to terminal 142 of data demodulator 62. This signal is conducted over line 438 to the input terminal 440 of delay network 442 and from the output terminal 444 of this unit over line 446 to terminal 448 of data rate selector 436, and serves to gate one of the applied pulse trains therethrough to output terminal 450 whence it is led over line 452 to terminal 414 of converter 412 and over line 454 to demodulator terminal 97.

The next system function, that of equalization of data for non-ideal characteristics of forward channel 14, is accomplished in equalizer 70 in accordance with the commands of equalization analyzer 76. These units are preferably digital computation circuits of the type generally set forth in the Bell System Technical Journal, February 1965 at pp. 267 et seq. In unit 76 a fast Fourier transform of the transmitted data signals divided by the received signals is performed to provide an incremental equalization signal to unit 70.

The examination of equalized regenerated data signals in rate analyzer 96 may be accomplished in any of several modes. Unit 96 is preferably a digital computation device capable of operating in all of these modes. In one mode the unit includes first processing means which extracts from the equalized data signals a measure of the instantaneous capacity of channel 14. This may be accomplished by determining equalization shortcomings due to varying channel transmission parameters, such as amplitude versus frequency and phase responses, bandwidth and noise. The unit then supplies this information to a second processing means which determines on the basis thereof whether the transmission rate should be increased or decreased from its existing level. The analyzer includes further means for generating a rate control signal in accordance with the result provided by the second processing means.

In a more simplified mode, analyzer 96 may derive repeat transmission requests from output device 90. To this effect, terminal 150 of unit 90 is connected by line 152 to input terminal 154 of rate analyzer 96. As mentioned above, these signals are generated by unit 90 when an unintelligible or uncorrectable message is received. The periodicity with which these requests are generated is a coarse measure of deterioration of transmission parameters of channel 14. To implement this mode of rate control, analyzer 96 includes third processing means, operative alone in this mode to evaluate periodicity of retransmission requests in conjunction with data rate to determine whether the transmission rate should be increased or decreased from its existing level. This decision is fed to the rate analyzer control signal generator. Existing data rate is supplied to analyzer terminal 101.

The production of repeat transmission requests in output device 90 may be accomplished by well-known error control techniques. It is customary in digital data transmission systems to include in data input devices such as element 18 of FIG. 1 means for inserting an error control code into generated data. For example $x$ error control bits may be calculated to indicate the correct contents of $y$ data bits by assigning each of the error control bits to a perticular combination, e.g. even pairs, alternate odd pairs, of data bits. The composite $x$ and $y$ message is transmitted by the transmission system and deciphered in the data receiver by error code detection apparatus. Associated error control apparatus is effective to correct data where the number of errors is sufficiently small. If an excess number of errors are detected, a retransmission request is generated.

In implementing the second described mode of rate analysis described above, an error control encoder for calculating the error code and inserting same into the transmitted data is included in data input device 18 and the composite message is generated at terminal 20 thereof. The error code detection and control apparatus is included in data output device 90.

There are of course numerous system variations within the contemplation of the invention as will be evident to one skilled in this art. For instance, in the system of FIG. 1, equalizer 70 is shown in series with the output of data demodulator 62. In this arrangement the equalizer is necessarily digital in nature. Alternatively, the equalizer may be analog in nature and interposed in series with the input of the demodulator. Rate analysis under the first described mode could likewise be analog in nature, wherein the analyzer would receive and operate directly upon the received modulated carrier signals. It is essential only that the analyzer have the capacity for detecting variations in the transmission parameters of the forward channel and for considering same in conjunction with existing data rate to direct changes in such rate.

The system has been illustrated in connection with a phase modulation technique. It is of course within the contemplation of the invention to accommodate the alternatives of frequency and amplitude modulation with evident modifications in units 42 and 62.

Also within the contemplation of the invention is the inclusion in the data transmitter of data scrambling apparatus. Such scrambling apparatus typically operates to transform data into quasi-random blocks of data to minimize self-induced noise on the transmission line by causing the data modulator to run at a nearly constant power output level. In this connection it should be noted that level control amplifiers, filters and the like have been omitted from the drawings for purposes of simplicity.

What is claimed is:

1. A system for transmitting digital data signals over a communication channel at a data transmission rate permitting maximum exchange of intelligible data commensurate with existing channel transmission characteristics, comprising a data transmitting station having means capable of generating data signals at a plurality of rates, means for receiving a rate control signal indicative of one of said plurality of rates, means responsive to said rate control signal to cause said generating means to generate said data signals at said indicated rate, and means for modulating said generated rate-controlled data signals to condition same for transmission over said channel, a data receiving station having a demodulator including means for receiving said transmitted signals, means for receiving said rate control signal and means responsive to said rate control signal for regenerating said data signals at said indicated rate, a data transmission rate analyzer for generating said rate control signal including means for processing said regenerated data signals to evaluate existing communication channel transmission characteristics and to determine therefrom the data transmission rate permitting maximum exchange of intelligible data commensurate with existing channel transmission characteristics, said analyzer including further means responsive to said processing means for generating said rate control signal, said signal indicating said one of said plurality of rates corresponding to said analyzer determined rate, said system having means for conducting said rate control signal to said transmission station rate control signal receiving means, said receiving station having means for conducting said rate control signal to said demodulator.

2. The system of claim 1, including further a communication channel equalization analyzer comprising means for processing said regenerated data signals to determine modifications required in said signals to compensate same for effects caused therein by said communication channel transmission characteristics, and means for generating equalization signals corresponding to said modifications, and a communication channel equalizer having means for receiving said regenerated data signals and means responsive to said equalization signals to effect said modifications in said regenerated data signals, said transmision rate analyzer means processing said regenerated data signals operative to process said regenerated data signals as modified by said equalizer.

3. The system of claim 2 wherein said communication channel constitutes a two-wire telephone line interconnecting said modulator and demodulator, said means for conducting said rate control signal to said transmission station rate control signal receiving means comprising at said receiving station a control signal encoder including means for encoding said rate control signal and a control signal modulator for conditioning control signals for multiplex transmission in a direction opposite to said modulated data signals on said two-wire line, and at said transmitting station a control signal demodulator for regenerating said encoded control signals, a control signal decoder including means for decoding said demodulated signals to reproduce said rate control signal and circuit means for conducting same to said transmitting station rate control signal receiving means.

4. The system of claim 3 wherein said receiving station includes further a data output device having means for receiving and storing said modified regenerated data signals and conducting same to data utilization apparatus on demand therefrom.

5. The system of claim 4 wherein said data generation means includes means for generating error control signals and intermixing same with said data signals and means for storing said intermixed signals, and wherein said data output means includes means for detecting said error control signals and determining inaccuracies in transmitted data, means for correcting a predetermined number of said inaccuracies, means operative upon determination of inaccuracies in excess of said predetermined number to generate a first control signal constituting a repeat transmission request, said receiving station including circuit means for conducting said first control signal to said control signal encoder, said encoder including means for encoding said signal, said control signal decoder including means for decoding said signal, said transmitting station including circuit means for conducting same to said data generation means, said data generation means having means responsive to said first control signal to regenerate said stored intermixed signals.

6. The system of claim 5 wherein said output device includes means for generating second control signals indicative of completed capacity of said storing means and third control signals indicative of inoperativeness of said utilization apparatus, sad receiving station including circuit means for conducting said second and third output device control signals to said control signal encoder, said encoder including means for encoding said signals, said control signal decoder including means for decoding said signals, said transmitting station including circuit means for applying same to said data generation means, said data generation means including means responsive to said second and third control signals to interrupt generation of data during occurrence of either of said signals.

7. A system for transmission of digital data signals from a data transmitting station to a data receiving station over a communication channel at a rate adapted to existing channel transmission characteristics, said transmitting station including an input device for producing said data signals, an input device controller having means for initiating and interrupting operation of said input device, means for receiving said data signals, means for receiving a data rate control signal indicative of one of a plurality of data rates, and means responsive to said rate control signal for reproducing said data signals at said indicated rate, a data modulator having means for receiving said data rate control signal, means for receiving said rated data signals and means for conditioning said data signals for transmission over said channel, said receiving station including a demodulator having means for receiving said transmitted signals from said channel, means for receiving said data rate control signal and means responsive to said rate control signal for regenerating said data signals at said indicated rate, a communication channel equalizer having means for receiving said regenerated data signals and means responsive to communication channel equalization signals to modify said regenerated data signals, a communication channel equalization analyzer having means for receiving regenerated signals as modified by said equalizer in accordance with previous communication channel equalization signals, means for processing said modified regenerated data signals to determine modifications required in said signals to compensate same for effects caused therein by unequalized communication channel transmission characteristics and means for generating signals indicative of said modifications, said signals constituting said equalization signals, a data output device having means for receiving and storing said modified regenerated data signals from said equalizer and means for conducting same to data utilization apparatus on demand therefrom, a data transmission rate analyzer having means for receiving said modified regenerated data signals from said equalizer and means for processing same to evaluate said existing communication channel transmission characteristics to determine therefrom the maximum transmission rate of intelligible data permitted by said existing characteristics, said analyzer including further means responsive to said processing means for generating said rate control signal, said signal indicating said one of said plurality of rates corresponding to said analyzer determined rate, receiving station circuit means for conducting said rate control signal to said demodulator, said system including further means for conducting said rate control signal to said input device controller and to said data modulator.

8. The system of claim 7 wherein said means for conducting said rate control signal to said input device controller and to said data modulator comprises at said receiving station a control signal encoder including means for receiving and encoding said rate control signal, and a control signal modulator for conditioning said encoded control signals for multiplex transmission in a direction opposite to said modulated data signals on said communication channel to said transmitting station and at said transmitting station a control signal demodulator for regenerating said encoded control signals, control signal decoder including means for decoding said demodulated control signals to produce said rate control signals and circuit means for conducting same to said input device controller and to said data demodulator.

9. The system of claim 7 wherein said receiving station includes further a data output device having means for receiving and storing said modified regenerated data signals and conducting same to data utilization apparatus on demand therefrom.

10. The system of claim 9 wherein said input device includes means for generating error control signals and intermixing same with said data signals and means for storing said intermixed signals and wherein said data output device includes means for detecting said error control signals and determining inaccuracies in transmitted data, means for correcting a predetermined number of said inaccuracies, and means operative upon determination of inaccuracies in excess of said predetermined number to generate a first control signal constituting a repeat transmission request, said receiving station including circuit means for conducting said first control signal to said control signal encoder, said encoder including means for encoding said signal, said control signal decoder including means for decoding said signal, said transmitting station including means for conducting same to said input device controller, said controller having means responsive to said first control signal to cause said input device to regenerate said stored signals.

11. The system of claim 10 wherein said data output device includes means for generating said control signals indicative of completed capacity of said storing means and third signals indicative of inoperativeness of said utilization apparatus, said receiving station including circuit means for conducting said second and third output device control signals to said control signal encoder, said encoder including means for encoding said signals, said control signal encoder including means for decoding said signals, said transmitting station including circuit means for applying same to said input device controller, said controller having means responsive to said second and third control signals to interrupt generation of data during occurrence of either of said signals.

12. The system of claim 7 wherein said data modulator is a phase modulator comprising a variable frequency oscillator having a frequency control circuit responsive to said data rate control signal and providing a multiplicity of oscillator output signals each at a different phase angle, a phase switch receiving said signals and responsive to phase switching control signals to generate an output signal constituting a series of controllably gated oscillator output signals, and a data to phase converter responsive to said rated data signals and said rate control signal to generate said phase switching control signals.

13. A system for transmitting digital signals over a communication channel at the maximum data transmission rate commensurate with existing channel transmission characteristics comprising a data transmission station including a variable rate data signal generater, a modulator receiving generated data signals and conditioning same for transmission on said channel, and a demodulator receiving modulated rate control signals from said channel and controlling said generator data signal rate, and a receiving station including means demodulating said transmitted modulated data signals, a transmission rate analyzer receiving said demodulated transmitted data signals and generating said rate control signals therefrom, and a modulator receiving said rate control signals and conditioning same for transmission on said channel.

14. A system for transmitting digital signals over a communication channel at the maximum data transmission rate commensurate with existing channel transmission characteristics comprising a data transmission station including a variable rate data signal generator, a modulator receiving generated data signals and conditioning same for transmission on said channel, and a demodulator receiving modulated rate control signals from said channel and controlling said generator data signal rate, and a receiving station including means demodulating said transmitted modulated data signals, means equalizing said demodulated transmitted data signals, a transmission rate analyzer receiving said equalized signals and generating said rate control signals therefrom, and a modulator receiving said rate control signals and conditioning same for transmission on said channel.

15. The system claimed in claim 14 wherein said transmitting station signal generator includes means for error correction encoding said data signals and wherein said receiving station includes means for error correction decoding said equalized signals, and including further signal utilization means receiving said decoded equalized signals.

No references cited.

KATHLEEN H. CLAFFY, Primary Examiner

T. J. D'AMICO, Assistant Examiner

U.S. Cl. X.R.

325—42